US008595703B2

(12) United States Patent
van Gogh et al.

(10) Patent No.: US 8,595,703 B2
(45) Date of Patent: Nov. 26, 2013

(54) CONTEXT BASED CODE ANALYSIS

(75) Inventors: Jeffrey van Gogh, Redmond, WA (US); Michael C. Fanning, Redmond, WA (US); Sean D. Sandys, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1702 days.

(21) Appl. No.: 11/343,691

(22) Filed: Jan. 30, 2006

(65) Prior Publication Data

US 2007/0180429 A1    Aug. 2, 2007

(51) Int. Cl.
*G06F 9/44* (2006.01)
*G06F 11/00* (2006.01)

(52) U.S. Cl.
USPC ........... 717/126; 717/124; 717/101; 714/38.1

(58) Field of Classification Search
None
See application file for complete search history.

(56) References Cited

U.S. PATENT DOCUMENTS

| | | | |
|---|---|---|---|
| 5,418,963 A | 5/1995 | Anezaki et al. | 395/700 |
| 5,485,618 A | 1/1996 | Smith | 395/700 |
| 5,896,537 A | 4/1999 | Landi et al. | 395/704 |
| 5,963,739 A | 10/1999 | Homeier | 395/704 |
| 6,047,390 A | 4/2000 | Butt et al. | |
| 6,138,272 A | 10/2000 | Tonouchi | 717/5 |
| 6,149,318 A | 11/2000 | Chase et al. | 395/704 |
| 6,353,925 B1 | 3/2002 | Stata et al. | 717/8 |
| 6,518,979 B1 | 2/2003 | Spertus et al. | 345/762 |
| 6,594,783 B1 | 7/2003 | Dollin et al. | 714/38 |
| 2001/0037494 A1 | 11/2001 | Levien et al. | 717/5 |
| 2005/0114838 A1* | 5/2005 | Stobie et al. | 717/124 |
| 2005/0229154 A1* | 10/2005 | Hiew et al. | 717/110 |
| 2006/0101373 A1* | 5/2006 | Bartz et al. | 717/101 |

FOREIGN PATENT DOCUMENTS

| | | |
|---|---|---|
| JP | Hei 04-367934 | 12/1992 |
| JP | Hei 11-134187 | 5/1999 |
| JP | 2001-034461 | 2/2001 |
| JP | 2004-220269 | 8/2004 |
| JP | 2004-326337 | 11/2004 |
| JP | 2006-018735 | 1/2006 |
| KR | 2003-0088523 | 11/2003 |

OTHER PUBLICATIONS

Harder et al, "Improving Test Suites Via Operational Abstractions", 2003, ICSE '03 Proceedings of the 25th International Conference on Software Engineering.*

(Continued)

*Primary Examiner* — Lewis A Bullock, Jr.
*Assistant Examiner* — Mark Gooray
(74) *Attorney, Agent, or Firm* — Workman Nydegger

(57) ABSTRACT

Embodiments provided a formalized set of intermediate analysis contexts that are relevant for analysis checks of target code. Such intermediate analysis context may include, but are not limited to, the development phase of targeted code, the type or state of the targeted code, a source manipulating the targeted code, a purpose for the targeted code, or other development or runtime requirements. Accordingly, embodiments dynamically identify a current analysis context under which targeted code is being developed and can then execute rules based on knowledge of what contexts the rule(s) may apply. More specifically, analysis rules can describe (e.g., via metadata) those context conditions under which a rule can run. Based on such description and the current context, those rules that have been configured to apply to such context conditions can be executed.

16 Claims, 2 Drawing Sheets

(56) References Cited

OTHER PUBLICATIONS

Caprile, et al., "Model Centered Interoperability for Source Code Analysis," Centro per la Ricerca Scientifica e Tecnologica, *available at* http://www.bauhaus-stuttgart.de/sam/caprile.pdf (12 pages enclosed).

Bishop, L., "Incremental Impact Analysis for Object-Oriented Software," Iowa State University, 2004, *available at* http://archives.ece.iastate.edu/archive/00000040/01/lbishop-thesis.pdf (60 pages enclosed).

Dudziak, et al., "Tool-Supported Discovery and Refactoring of Structural Weaknesses in Code," Technical University of Berlin, Feb. 2002, *available at* http://swt.cs.tu-berlin.de/lehre/seminar/ss02/Papers/DudWlo02%20-%20Tool-Supported%20Discovery%20and%20Refactoring%20of%20Structural%20Weaknesses%20in%20Code.pdf (200 pages enclosed).

Kaiser et al. "Database Support for Knowledge-Based Engineering Environments" 1988, New York, New York, USA, 14 pages.

Kaiser et al. "A Metalinguistic Approach to Process Enactment Extensibility" 1996, Columbia University, 12 pages.

Feiler et al. Software Development "Granularity Issues in a Knowledge-Based Programming Environment", Dec. 1987, Columbia University, 10 pages.

Yau et al. "An Integrated Expert System Framework for Software Quality Assurance", 1999, 6 pages.

\* cited by examiner

CONTEXT BASED CODE ANALYSIS

CROSS-REFERENCE TO RELATED APPLICATIONS

N/A

BACKGROUND

Most software is developed as a number of reusable software objects, each designed to carry out one or more tasks. The utility and functionality of the software, as well as the computing system running the software, depend on the proper coding of the source code that is compiled or interpreted for execution by a processor. Coding errors usually cause a deviation from expected functionality of the software and potentially may impact other parts of the computer system (e.g., other applications, databases, the operating system, etc.) Such coding errors not only frustrate the user's computing experience with the software, but can also cause undesired effects throughout the computer system. Therefore, producers of high-quality software expend significant testing and analysis efforts to eliminate errors in their software.

Market demand and the creativity of programmers and designers, however, have led to increasingly complex—yet powerful—software. As the complexity of software increases, so often does the number of lines of source code needed to implement the software. As a direct result, the potential for errors in the source code continues to increase. Accordingly, software must often be tested or analyzed numerous times and in a variety of ways (before and after release) to help ensure that the software operates as intended.

In some analysis environments, a tester develops automated rules or tests (used herein interchangeably) that verify the operation of one or more portions of the software. For example, a rule may automate entering of input field values within a graphical user interface, calling software objects with various input parameters and under a wide range of conditions, gathering the resulting output, and determining if a test passed or failed. A tester (who may or may not be the test developer) can then execute the test case, which provides an indication of whether the object or target code under test passed or failed (and thus whether the object is operating as intended).

Currently, test developers write separate rules for different levels of software verification, i.e., the amount of analysis that each rule performs when determining if an object or piece of code passed or failed. Verification levels for rules that test software vary widely depending on myriad factors. Accordingly, there is generally a tradeoff between the amount of time consumed in running a rule or test case and how thoroughly the software is tested. In particular, the less outputs that are generated and analyzed, the less time consuming the testing becomes. For example, a test developer may write rules for simply testing the stress or load of the software. In such a case, the resulting outputs of the test case may be ignored and the object or targeted code is considered to have passed if the software or system doesn't crash. While this form of analysis allows for a quick test of the software, it does not provide a complete determination of all the effects caused by the software. As such, there is usually much debate and consideration needed in determining the verification level necessary for each rule to appropriately analyze the software.

In order to allow for a wide range of testing verification levels, code analysis tools (e.g., static code analysis tools) have been developed, which provide a semi-automated mechanism for software developers to check their code for problems and inconsistencies. More specifically, test developers populate such tools with a set of rules with various verification levels for analyzing software source, object, or binary code in order to identify the correctness, completeness, and/or quality thereof. These tools typically perform or execute the analysis of the software as a monolithic operation controlled via various forms of configuration. In other words, specific checks or rules applied to the code are either enabled or disabled by source control expressions (such as #pragmas), via tool command-line options, or by settings rendered in a separate control file. Although this allows a tester some control over what types of rules to run at various stages in the development process, there are still several shortcomings and limitations to such approach.

For example, in order to appropriately test code, a tester (i.e., user of the static code analysis tool) needs to have extensive knowledge of the various rules including, but not limited to, at what stages and under what conditions the rules should be applied. Such knowledge of all test cases, however, is typically beyond the skill set of most code developers (since they are typically not specialized as test developers). As such, the tester may not be applying rules at the appropriate times and under the appropriate conditions. Moreover, because such tests are typically static in nature (i.e., they are usually executed by explicit gestures from the tester), there are various time inefficiencies when executing such tests. For example, identical checks may be ran over and over again, issues may be raised at inappropriate junctures in the process (e.g., where they are repeatedly ignored or deferred), and/or errors or faults may not be identified at a sufficiently early time in the development process (i.e., it is axiomatic that the further from check-in a problem is identified or located, the more costly it is to resolve). Accordingly, these and other related shortcomings of typical code analysis tools can often cause a number of problems such as undue work, user and developer frustration, performance problems, unidentified errors or faults, time costs, etc.

BRIEF SUMMARY

The above-identified deficiencies and drawback of current code analysis tools are overcome through example embodiments of the present invention. For example, embodiments described herein provide for a code analysis tool that automatically manages execution of a set of predefined rule—in order to balance performance considerations—by dynamically tracking analysis context under which code is developed and applying rules (or portions thereof) that correspond to the current context conditions. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for a computing system that is configured with a code analysis tool that receives targeted code, which is to be analyzed for correctness, completeness, and/or quality based on a set of predefined rules. Code analysis context information is also received from development device(s) for dynamically tracking a current code analysis context for which the targeted code is being developed. Further, context parameters corresponding to a rule selected from the set of predefined rules is received. Note that the context parameters describe execution conditions for at least a portion of the rule in terms of the code analysis context information. Thereafter, the rule context parameters are evaluated in view of the current code analysis context for dynamically determining if at least a portion of the rule can be executed against the targeted code under analysis; thus, applying the at least a portion of the rule at the appropriate phase in the development process.

Other exemplary embodiments provide for a code analysis tool that includes a dynamic context tracking module for receiving code analysis context information from development device(s) used in determining a current code analysis context for which a targeted code is being developed. Code analysis tool also comprises a rule management module for evaluating the current code analysis context and context parameters that indicate execution conditions for at least a portion of the rule in terms of code analysis context information. Based on the evaluation, the rule management module dynamically determines that at least a portion of the rule can be executed against targeted code that is to be analyzed for correctness, completeness, and/or quality. In addition, the code analysis tool includes an execution module for executing the at least a portion of the rule against the targeted code under analysis such that at least a portion of the rule is applied at an appropriate phase in the development process.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
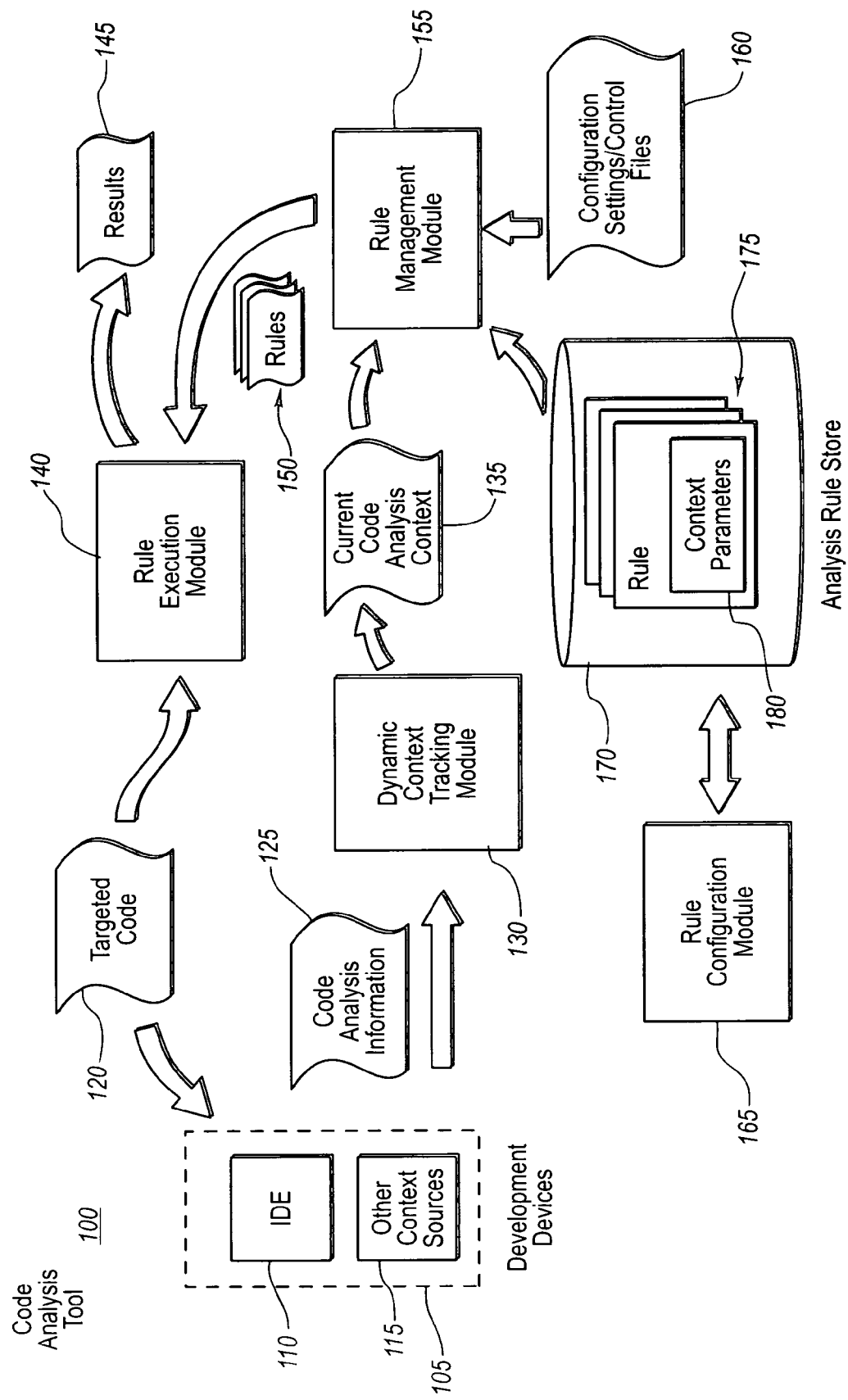
FIG. 1 illustrates a code analysis tool configured to dynamically check software based on the context under which targeted code is developed in accordance with example embodiments.

The present invention extends to methods, systems, and computer program products for dynamically managing the execution of rules in a code analysis tool based on the current context under which the code is being developed. The embodiments of the present invention may comprise a special purpose or general-purpose computer including various computer hardware or modules, as discussed in greater detail below.

Embodiments provided herein formalize an intermediate number of analysis contexts that are relevant for analysis checks of targeted code. Accordingly, embodiments dynamically identify a current analysis context under which targeted code is being developed and can then execute rule(s) (or portions thereof) based on knowledge of what contexts the rule(s) may apply to. Such intermediate analysis context may include, but are not limited to, the development phase of targeted code, the type or state of the targeted code, a source manipulating the targeted code, a purpose for the targeted code, or other development or runtime requirements. Note that such intermediate analysis contexts are related to other phases of the software development process besides the literal development of code. Such other phases may include, for example, building and packaging gestures, deployment testing, and analysis of code at runtime when literally executing—e.g., executing in various machines and network configurations. Of course, there are numerous overlapping and other relationships for defining or formalizing code analysis contexts. Accordingly, the term "code analysis context" as defined herein should be broadly construed to include any number, combination, and/or hierarchical relationship of analysis context noted above and defined in greater detail in subsequent embodiments.

Note that knowledge of the current context conditions may be acquired by the system in a variety of ways. For example, such context information may be obtained through a coupling with an integrated development environment (IDE), which typically communicates project types and source language, and which may have knowledge of compiler-settings and/or build flavors, etc. Alternatively, or in conjunction, such context information may be obtained by inspection of source-based and compiler provided metadata and/or by inspection of the machine which is hosting the binaries for the code. In addition, other context sources for providing code analysis information may include such things as the inspection of the larger network system hosting a machine.

Regardless of how the current code analysis context conditions are determined, in order to determine a rule set relevant to such conditions, analysis rules (or other data objects) can describe (e.g., via metadata) those context conditions under which a rule (or a portion thereof) can run (as well as other information such as the rules preferred or default context). Such decisions about the context for running a rule or other information provided (e.g., in the metadata) may be made by a rule developer, but other embodiments also provide for modifying, noise filtering, and/or otherwise overriding such context conditions. For example, some embodiments allow for modifying or overriding the context under which a rule may apply by explicit gestures inside the IDE and/or by modifying control files associated with analysis runs. Accordingly, when a developer goes to configure code analysis options, he/she may have the option to override the set of contexts associated with each rule. This information may then be stored in the project file containing other code analysis options set by a user.

Nevertheless, for those rules that have not been overridden, during the various development stages the current context is dynamically determined and, based on information or metadata provided, those rules that have been configured to apply to such context conditions are executed. As can be seen, this allows for the dynamic analysis of the code during various development stages so that a code developer may be notified of potential problems as early in the development process as possible. In addition, the test developer, who generally has more specific knowledge about the rule, can consider and set the context under which the rules should apply. Further, as conditions change or evolve (e.g., changes in formalized contexts conditions under which the targeted code is developed), the various metadata can also be modified and keep current, thus making the rules extensible.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Embodiments described herein provide for a code analysis tool that dynamically manages the execution of rules taking into consideration a myriad of factors in order to balance performance considerations. For example, embodiments herein consider that messages generated by some rules are more costly to fix when detected during or after building the code. Accordingly, the developer may want to be notified of these warnings as early as possible, typically while editing code. Further, messages generated by some rules are most interesting to address when the code is ready for various development stages such as check-in or when a development milestone is complete. As an example, it does not make much sense to perform an analysis that detects unused code while a milestone is not complete because the code could be used later in the development process. Moreover, as previously mentioned, some rules are extremely costly to run. As such, a developer may not want to incur such analysis cost on every incremental build or even a complete rebuild.

Other factors to consider account for rules that require more or less binary metadata to complete analysis, depending upon their functionality. Some rules might require information that is only available in source code, which may thus compile away when files are actually generated. Yet, other rules require the literal object code that is or will be written to disk. Still other embodiments account for the consideration that some rules require that binaries be in a true release condition, which differs from the builds generated by a developer on a client box. For example, developers typically do not create full-signed binaries that are signed by a particular company's actual security key.

Still other factors that may be taken into account consider that some rules depend on machine configuration(s) that differs significantly from a client developer system. For example, some web application analysis might only be relevant if executed against code that is actually deployed on a web server. In addition, some rules require special knowledge about the execution context of a binary. Code that may never be localized or run on non-English systems, for example, will typically not need to be inspected for globalization/localization-spec issues. Further consider that some rules must run in a special context in order to verify issues that relate to the larger network system. As an example, security checks against web application(s) deployed to the Internet might need to execute outside the fire-wall Intranet.

Also contemplated herein is that fact that some rules behavior alters according to circumstances related to the lifetime of the code. As an example, a binary that has been previously released to the external customers might be required to maintain a high level of backwards compatibility. As such, rules that fire violations which require a breaking change to resolve should not fire. Further, some rules behavior alters according to run-time expectations for execution behavior. As an example, some performance checks might only be relevant to frequently-called, performance sensitive code. Running these rules may not be desirable against code that is called infrequently or which necessarily entails execution cost that overwhelms the benefits of resolving identified problems. Related to the above, analysis should vary in other circumstances according to whether a fix may or may not be possible in the analysis targeted code. As an example, analysis might take place against code patterns which are emitted by a compiler, which may not be influenced by altering user code. A compiler team, however, might wish to identify these issues and make a change in the compiler that generated the analysis target.

Also contemplated within some embodiments is that some rules behavior change according to the intended reuse (or non-reuse) of the targeted binary code. Code which may be consumed by arbitrary third-party developers, for example, might need to conform to certain standards in order to issue consistency and usability. These standards may be disregarded for an entirely internal project on a team that enforces a different coding standard. In addition, rules behavior might alter according to project resource considerations. For a project with constrained resources or with a tight deadline, for example, analysis might need to be restricted to high-certainty results with serious correction implications.

Of course, there are a myriad of factors and considerations that can be accounted for in accordance with example embodiments described herein for managing the execution of rule(s) based on various contexts in the development process. In fact, as will be described in greater detail below, because analysis context under which code is developed continuously changes, embodiments described herein allow for the extensibility of how various rules are managed and executed.

Accordingly, considerations described herein for determining under what context a rule (or a portion thereof) should execute are used for illustrative purposes only and are not meant to limit or otherwise narrow the scope of the present invention unless explicitly claimed.

In any event, taking into account some of the above considerations, FIG. 1 illustrates a code analysis tool 100 that manages the execution of rules based on current code analysis context for which such code is being developed. As shown in FIG. 1, targeted code 120 may be distributed for development among one or more of a myriad of development device 105, which include IDE 1110 and other devices that can provide context such as those listed as other context sources 115. For example, the targeted code may be in source code form in IDE 110, or may be binary code running within a machine or system. Of course, other forms of the targeted code 120 are also contemplated herein. For example, as described in greater detail below, the targeted code 120 may also be in the design phase, which is an abstraction from source code. Accordingly, any specific type of targeted code 120 described herein will depend on the appropriate development or runtime state.

Regardless of the development or runtime state, embodiments herein provide a dynamic context tracking module 130 that can obtain code analysis information 125 from various development devices 105 as described herein. As will be described in greater detail below, the code analysis information 125 includes information about the context under which the targeted code 120 is currently being analyzed and/or developed. Note that the code analysis information 125, and thus the analysis context information, may be acquired by the code analysis tool 100 or dynamic context tracking module 130 in a variety of ways. For example, the dynamic context tracking module 130 may be coupled to IDE 110, which may communicate project types and source language, and which also may have knowledge of compiler-settings and build flavors, etc.

The context information in the code analysis 125 may also be obtained by inspection of other context sources 115 such as source-based and compiler provided metadata, by inspection of the machine which is hosting the binaries or target code 120, and/or by inspection of a larger network system hosting a machine. Of course, as one would appreciate, there are numerous context sources 115 that may be obtained by dynamic context tracking module 130. In fact, modules within the code analysis tool 100 (e.g., rule execution module 140) and/or even the rules themselves may provide code analysis information 125. Accordingly, any specific device, component, module, data object, etc., for providing code analysis information 125 as described herein is for illustrative purposes only and is not meant to limit or otherwise narrow embodiments herein unless explicitly claimed.

Also note that the code analysis information 125 may be dynamically obtained through any numerous well known mechanisms such as request-response, push-pull, pub-sub systems, etc. For example, one embodiment allows for the code analysis information 125 to be obtained using an event notification system. For example, as the context changes or other events occur that affect the development of the targeted code 120, a notification (typically in the form of the code analysis information 125) can be sent or otherwise received by the dynamic context tracking module 130. Of course, there are numerous ways for obtaining the code analysis information 125. Accordingly, any specific reference to how the code analysis information 125 is obtained is used herein for illustrative purposes only and is not meant to limit or otherwise narrow the scope of embodiments described unless explicitly claimed.

In any event, as previously mentioned, the dynamic context tracking module 130 formalizes a number of analysis context relevant for checks. Accordingly, regardless of where or how the code analysis information 125 is obtained, this information 125 may then be used to determine a current code analysis context 135 based on those contexts defined within (or otherwise obtained by) the dynamic context tracking module 130. Note that the current code analysis context 135 may be defined in terms of numerous considerations, such as those previously noted. For example, such analysis contexts may be defined in terms of the development phase of the targeted code 120, the targeted code 120 state, the type of source manipulating the targeted code 120, a purpose for the targeted code 120, and/or other development or runtime requirements and considerations.

Note, that the analysis context defined above may include numerous properties or conditions that may or may not be expressed in various hierarchal terms (e.g., how removed the analysis is from writing the code). For example, a code analysis context defined in terms of a phase of development may include stages of a design, build, deployment, or other phases or properties. Further, the analysis context may be defined in terms of previous phases, as well as the current phase for which analysis is taking. Moreover, each phase of the development may further be defined through other sub-phases. For example, the build stage may include sub-stages of an editing phase, compilation phase for incremental builds, or a sub-phase of before a check-in. By way of another example, the analysis context may be defined in terms of its state or type such as source code, object code, binary code, or an abstraction code state, which typically does not provide a complete description of the code itself.

Also note that the analysis context(s) (e.g., current code analysis context 135 as the case may be) may further be defined in terms of a hierarchical relationship between each other. For example, one code analysis context may be defined in terms of the successful (or unsuccessful) completion of another analysis context. Moreover, there may be overlapping properties between the analysis contexts, such as the case for a context defined in terms of a build environment against binaries that may or may not correspond exactly to what will be released to customers. Of course, there are numerous relationships for defining or formalizing code analysis contexts. Accordingly, as previously mentioned, the term "code analysis context" (e.g., current code analysis context 135) should be broadly construed to include any number, combination, and/or hierarchical relationship of analysis context as defined herein.

Regardless of the formalized code analysis context(s) defined, this list of contexts are used in conjunction with the code analysis information 125 for determining current code analysis context 135. Accordingly, rule management module 155 can use the current code analysis context 135 for dynamically managing execution of rules 175 in analysis rule store 170. More specifically, in order for the rule management module 155 to dynamically determine a rule 175 set for execution with respect to the current code analysis context 135, each analysis rule 175 (or other data object) describes (e.g., via metadata) the context parameters 180 under which a rule may run. Typically, such context parameters 180 will be defined by the rule developer; however, embodiments also contemplate allowing modification and/or addition of the context parameters 180 using rule configuration module 165.

As will be described in greater detail, the rules may also be overridden through other various mechanisms.

In any event, the context parameters 180 may include such information as what context a rule 175 may or may not be applied, and/or may have a list of context that are prioritized, for example, as a supported, preferred, optional, required, or any other well known prioritization. As a more concrete example, the naming and casing rules may be marked as supporting all analysis phases (i.e., the naming rules may suitable for execution at any development phase). The preferred phase for execution, however, may be the background period. Accordingly, these checks should execute while a developer is editing source, but may also execute in other phases.

Further, the context parameters 180 can include metadata that define the rule in terms of behaviors such as a run-time duration for completion of analysis, information needed for input, or resulting output, etc. Accordingly, such additional information may be used by the rule management module 155 (and/or the dynamic context tracking module 130 for determining current code analysis context 135) for determining the appropriate rules 150 needed for execution. Of course, the context parameters 180 may be defined in terms overlapping properties, hierarchical relationships, etc., in a similar fashion to that described above with regard to the code analysis context(s). For example, in one embodiment, analysis of the rule may occur in any phase that is equal to or more removed from the current specified phase. For example, a rule that is configured to run during a background compilation may also run during a build, check-in, or milestone phase.

Note that typically the test developer, who generally has more specific knowledge about the rule, can consider and set the context parameters 180 under which the rule should apply. Such considerations may include, but are not limited to, the following (not necessarily in any particular order). First, during what development phase does the message generated by this rule make sense? Second, how quickly should control return to the user? For example, analysis that takes place while editing code typically should not impact perceived performance of the editors. Third, how much metadata is required to complete the check? For example, analysis that occurs against an object design diagram might not provide information about whether a type is or is not publicly visible to third-party developers. Fourth, does the likely fix for an issue constitute a breaking change? That is, will fixing the issue break consumers of previous version of the modified application program interface (API)? If so, this information may need to be given to the developer as soon as possible in the development process. Otherwise, if a breaking change against code that has previously shipped is identified, a typical resolution would be to not surface the issue to a developer at all (assuming analysis has been configured to maintain a high level of backwards compatibility). In other words, if the problem has shipped and is therefore no longer safe to fix (as it may cause breaks for consumers of the previous version), then a filtering of the result may be needed or desired. Fifth, how costly is it to resolve an issue? How much code will be changed? How much time will the analysis take? How likely is a change to introduce a regression? Is the source code relevant to a problem available for modification? Sixth, what special binary, operating system (OS), machine, and/or network considerations influence rule behaviors and/or whether a check should run? Seventh, what special project considerations influence what analysis takes place and/or what results should be returned to the user?

In addition, as previously mentioned, embodiments herein provide that the context parameters 180 are modifiable or otherwise configurable. Accordingly, rule configuration module 165 can be used (by the either the rule and/or code developer) for extending or otherwise limiting under which analysis context(s) a rule may run. Alternatively, or in addition, the context under which a rule may run can be overridden though configuration settings/control files 160. For example, the rules may be overridden through such things as explicit gestures inside IDE 110 or by modifying control files associated with analysis runs. Accordingly, one embodiment allows a developer to access a configure code analysis option, which may allow them to override the set of context associated with each rule. This and other information may then be stored in a project file containing other code analysis options set by the user.

Related to the configuration of rules/contexts, embodiments herein also consider that some configuration gestures might be specific to checks; and therefore, provided herein are configuration options that can be coupled to larger analysis contexts. For example, embodiments herein allow for a rule to be throttled in some way (e.g., a noise filter setting that ranges from 0-100% and can be adjusted by a knob or other throttle control mechanism provided to the user), which limits output for review, constrains output to a high certainty options, and/or limits time-to-analyze. Note that this rule configuration option should exist seamlessly in the system, and there can be a coupling between the rule-specific configuration and contexts defined by the larger system (e.g., when running a background analysis, limit noise level to 50% certainty or higher).

Other embodiments also provide for mapping analysis context configurability to human roles in a project. More specifically, individuals working on a software development project typically: (1) make a contribution to the code at specific junctures that imply analysis contexts; have varying expertise that will make results more or less sensible to them; and (3) have more or less authority to make decisions related to where (and possibly how many) resources are allocated. For example, a developer should see results that are specific to here changes, against code for which she is response. A project manager, on the other hand, may be permitted to dial back results in order to limit developer/test cycles dedicated to a specific analysis. Contrast this with a build manager who might be responsible for identifying and fixing issues related to binary/product completeness (e.g., are all binaries present? Virus-free? Not corrupted? Etc.), but will have neither technical capacity nor capability of fixing a correctness issue. Accordingly, embodiments herein allow for analysis context configurations described herein to automatically map to the various roles of teams and others involved in the code development and runtime process.

Regardless of how the rules and/or analysis contexts are configured, based on the analysis between the current code analysis context 135, the context parameters defined within each rule 175, and/or based on configuration settings/control files 160, rule management module 155 may then select a set of rules 150 for execution. Accordingly, rule execution module 140 can apply the set of rules 150 against the targeted code 120 to produce results 145. As will be appreciated, such results 145 will vary greatly depending upon such things as the analysis context, the rule being applied, and other factors. For example, the results 145 can be immediately reported to a user editing source code as intellisense squigglies for such things as naming convention analysis, while other rules 150 may produce no feedback to the user at all, as with some stress tests. Other results 140 may be reported to files and or produced in some other data format for further analysis. Of course, there are numerous results 145 that may apply to embodiments described herein, and any specific results produced under any context described is for illustrative purposes only and is not meant to limit or otherwise narrow the scope of embodiments herein.

The following provides some examples of intermediate analysis context defined in terms of the development phase of targeted code, the type and/or state of the targeted code, a source manipulating the targeted code, a purpose for the targeted code, or other development and/or runtime requirements. As noted above, and in the following description, these intermediate analysis contexts may further be defined in terms of any combination, overlapping properties, and/or hierarchical relationship. Moreover, as previously mentioned, context parameters 180, analysis contexts defined (e.g., current code analysis context 135, configuration settings/control files 160, and the rules themselves, are extensible so the following list (as well as other contexts or analysis described herein) of analysis contexts and/or described rules are not meant to be exhaustive.

For example, rules 175 may be described in terms of background analysis that occurs during an editing stage in the IDE 110, for example, for informing a developer of changes to source code. Other analysis may occur in the context of each incremental build or complete build as defined by context parameters 180. For example, during compilation, rules defined for background and compilation phases may execute. Such checks may be relevant to naming and casing, and are typically extremely performant and/or represent high-value correctness checks flagging serious problems that should normally be addressed immediately.

The context parameters 180 and/or current code analysis context 135 may be defined in terms of analysis that occurs before a check-in phase. For example, before check-in, an analysis may occur that rolls up background, compilation, and check-in phase rules. Accordingly, rules 175 that are specifically targeted for the check-in phase as are typically high-value rules 175 that take longer to execute and/or flag problems that typically should not be checked into the official source base.

Other analysis context may be defined or flagged as running in terms of a milestone phase, which will typically be executed by an explicit user gesture. Accordingly, rules that are specifically targeted for the milestone phase may be those that are extremely expensive to run, which require a high level of review (i.e., they have a higher incident of false positives than other checks), and/or which constitute work items that are deferred due to schedule considerations or because the work is more easily accomplished as a batch.

Of course, as previously mentioned, as the environment for the code analysis 100 changes the analysis context under which the rules 175 are ran may also change. For example, as processing speed increases, it may be determined that rules previously ran in only a milestone phase may be ran in some of the previous phases. Note, however, that there is numerous things that can change or affect analysis context, which is why rule configuration module 165 can be used to modify the context parameters 180 (as well as the formulation of analysis context used to create current code analysis context 135) in order to update and adjust the system as necessary.

Other analysis context may include analysis that occurs in a build environment, against binaries that may or may not correspond exactly to what will be released to customers. There may also be an analysis that occurs against binaries which are deployed on a configuration that does not necessarily correspond to a customer run-time environment. Further, as previously mentioned, there may be analysis that occurs against abstractions (such as a design-time analysis) that typically do not provide a complete description of the resulting code. Other analysis context may be defined by source or object code that may be emitted to disk. Other analysis context(s) consider or account for compilation settings, such as whether the current build has been built with optimizations. Other analysis that occur against binaries may consider the specific code purpose or run-time purpose, such as running on non-English systems, or those that are deployed as part of a web application. Accordingly, such code that will not be localized or run on non-English systems, for example, may not need to be analyzed or have rule executed for globalization/localization-spec issues. Another analysis context or context parameters 185 may be defined in terms of analysis that occurs against binaries which are or are not deployed in a specialized environment, such as an Intranet server or on the other side of a firewall. Such rules typically run in a special context in order to verify issues that relate to the larger, network system.

Still, other context analysis may occur against code which may or may not have been previously shipped, or which may or may not be provided by a third party. For example, if a context is considered to have come from a third party, then a virus check or rule may need to be ran as defined by the context parameters 180. Still other analysis may occur against code which may or may not be consumed by external or internal customers, or which may be restricted to use in a private team or other run-time environment. Analysis context may be further defined by analysis against targets that may or may not have stringent requirements for the run-time characteristics such as performance or security. Components that may require advanced security permissions (such as the ability to write to arbitrary disk locations) until less security-related analyst then code that would be running a partly-trusted environment. Still yet, other analysis contexts include analysis against targets that will be deployed on systems with specific operating system configurations, such as a requirement that only government-approved cryptographic services are enabled. Other analysis contexts may be defined against targets that are or are not in maintenance mode or which are developed on a team subject to stringent staffing or deadline considerations.

Note that analysis potentially occurs against a variety of constructs (i.e., targeted code 120) that refer to information raised from source code, binary code, or abstractions associated with neither (such as analyzing class diagrams, uses of database tables, validating database schemas, verifying stored procedures, applying naming/casing conventions to database-specific identifiers, and/or firing violations based on current project settings). Moreover, configuration of the rule set relevant to the aggregated set of current context typically occurs dynamically. Accordingly, results are typically returned to the user at the precise and appropriate point in the software development life-cycle. As noted herein, a correct result or the precise and appropriate point in the software development life-cycle will vary depending on such things as: a codes'/abstractions' current condition; its current or presumed machine, operating system, network and/or runtime environment; given projects requirements for aspects of quality including security, reliability, backwards compatibility, and literal performance; given project life-cycle, time-line and/or resource constraints; given time-to-analyze constraints; given ability of person receiving results to understand and influence results; given any special configuration afforded by specific checks or due to default configurations being overridden for absolutely any reason not cited above including sheer cussedness of users; etc. In addition, because the analysis context (e.g., rules 175, context parameters 180, etc.) are configurable, extensible, pluggable, etc., embodiments described herein define an open-ended system for describing an intermediate number of context relevant to analysis.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagram for FIG. 2—is typically used to indicate the desired specific use of such terms.

Figure 2:
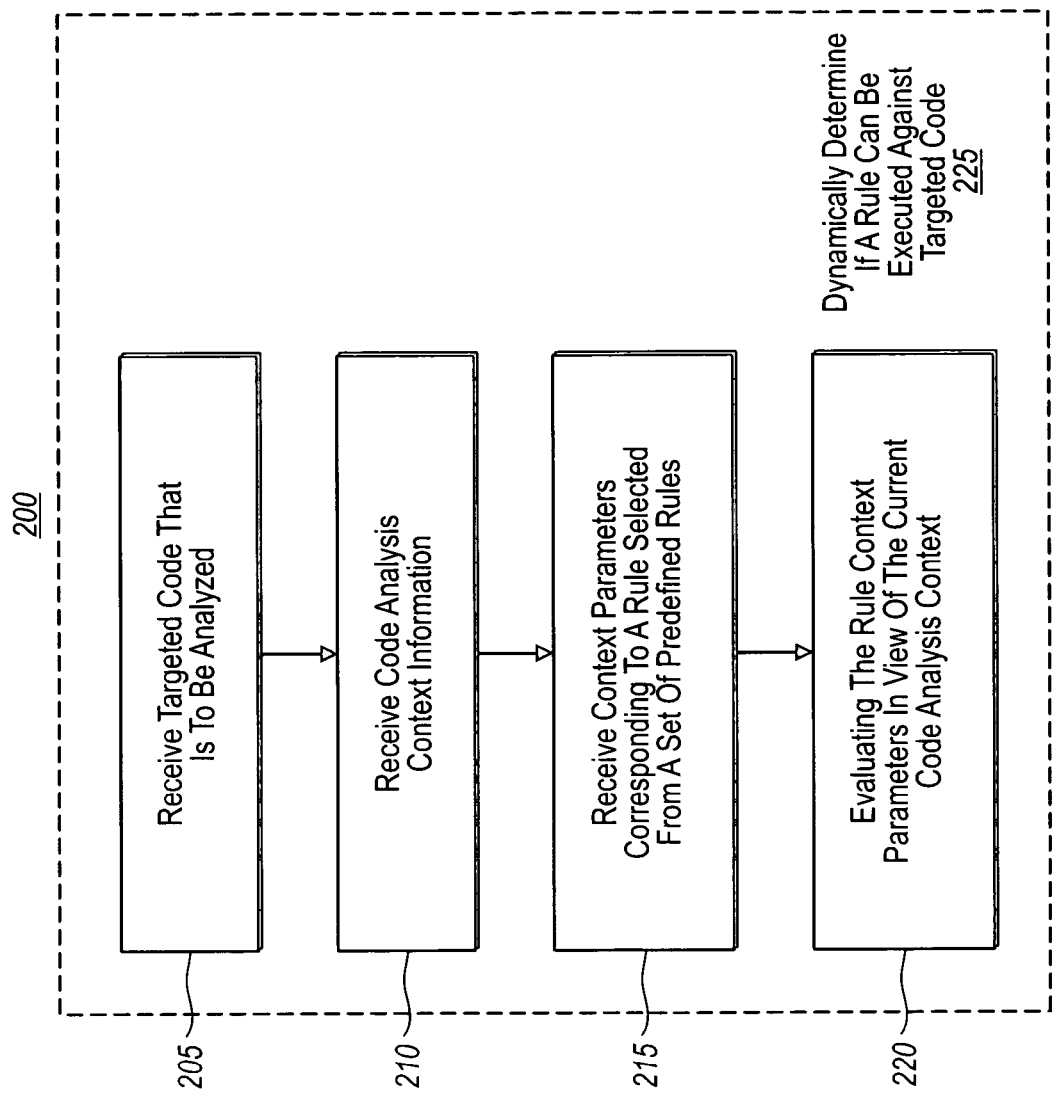
FIG. 2 illustrates a flow diagram for a method of managing execution of rule(s) by dynamically tracking analysis context under which code is developed in accordance with example embodiments.

As previously mentioned, FIG. 2 illustrates a flow diagram for various exemplary embodiments of the present invention. The following description of FIG. 2 will occasionally refer to corresponding elements from FIG. 1. Although reference may be made to a specific element from this Figure, such references are used for illustrative purposes only and are not meant to limit or otherwise narrow the scope of the described embodiments unless explicitly claimed.

FIG. 2 shows a flow diagram for a method 200 of managing execution of a set of predefined rules—in order to balance perform considerations—by dynamically tracking analysis context under which code is developed and applying at least portions of those rules that correspond to current context conditions. Method 200 includes a step for dynamically determining if a rule can be executed against targeted code 225. More specifically, step for 225 includes an act of receiving 205 targeted code that is to be analyzed. For example, code analysis tool 100, rule management module 155, rule execution module 140, development devices 105, or other modules and components within a computing system may receive targeted code 120 that is to be analyzed for correctness, completeness, and/or quality based on predefined rules 175.

Step for 225 also includes and act of receiving 210 code analysis information. For example, dynamic context tracking module 130 may receive code analysis information 125 from various development devices 105 for dynamically tracking a current code analysis context 135 for; which targeted code 120 is being developed. Note that the current code analysis context 135 may be defined in terms of targeted code development phase, targeted code type or state, a source manipulating targeted code 120, a purpose for the targeted code 120, or one or more develop or runtime requirements.

In the case where the targeted code development phase is defined, such a phase may include stages of design, build, deployment, or others. Also note that the build stage may include such things as an editing phase, compilation phase for incremental builds, or before a check-in phase. As such, rules that are defined for such stage might be background analysis that occurs against the targeted code 120 that has not yet complied to disk. Further note that a build stage may include a milestone phase, which requires specific user input to execute the at least a portion of the rule due to expense required for the execution thereof in terms of one or more of analysis duration, required input, required output, high or frequent incidence of false positive, scheduling considerations or because execution is most easily accomplished as part of a batch with other rules.

Also note that when the current code analysis context is defined in terms of the targeted code type or state, such type or state include such things as source code, object code, binary code, or an abstraction code state. For the abstraction code state, such state may be a design-time analysis of the targeted code that does not provide a complete description of the source code.

Step for 225 further includes an act of receiving 215 context parameters corresponding to a rule selected from a set of predefined rules. For example, rule management module 155 may receive both the current code analysis context 135 as well as context parameters 180 corresponding to one or more rules selected from the rule set 175. Note that the context parameters define execution conditions (via, e.g., metadata) for at least a portion of the rule in terms of at least the code analysis context information. Further, context parameters 180 may include metadata about rule behavior in terms of one or more of a run-time duration for completion of analysis, information needed for input, and/or resulting output. Note that what portion of the rule to apply (e.g., the amount or type of results thereto) may be based on other factors, such as configuration that influences or alters rule behavior. As previously mentioned such configuration may be based on settings/control information that is meaningful to literal rule execution, a noise filtering, or other control mechanisms.

Further note that the context parameters 180 define the execution conditions of supported code analysis contexts, which are prioritized by one or more of preferred, optional, required, etc. Nevertheless, the execution conditions are capable of being overridden by one or more configuration setting and various development devices 105, control file associated with code analysis tool 100, and or by allowing for the context parameters 180 to be configurable. In addition, note that the context parameters may be configurable to allow for extending existing context conditions.

Step for 225 further includes an act of evaluating 220 the rule context parameters in view of the current code analysis context. For example, rule management module 155 may evaluate the rule context parameters 180 and current code analysis context 135 for dynamically determining portions or complete rules 150 for execution against targeted code 120. Note that such evaluation may be done in order to apply the rules 150 at an appropriate phase in the development process. Also note that the evaluation of the rule 175 context parameters 180 in view of the current code analysis context 135 may take into consideration a hierarchical relationship between code and analysis context, the set of predefine rules 175, or both.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system comprising an analysis tool that checks software using a test case comprising a set of rules, a method of managing executing of the set of rules to apply the rules at an appropriate phase of code development process by determining a context under which code is developed and applying at least a portion of the rules based on the determined context, the method being performed on one or more computer processors with the computer system, the method comprising:

receiving targeted code that is to be analyzed for one or more of correctness, completeness, or quality based on a test case comprising a set of rules, each rule in the set of rules having associated context parameters, the context parameters including metadata, the metadata defining each of a run-time duration for completion of analysis, information needed for input, and resulting output;

dynamically performing the steps of:

receiving context information from one or more code developments devices;

determining a current code analysis context from the received context information, the current code analysis context comprising current context conditions, wherein the current code analysis context is defined in terms of two or more of the targeted code development phase, the targeted code type or state, a source manipulating the targeted code, a purpose for the targeted code, or one or more development runtime requirements;

receiving context parameters associated with each rule from the set of rules, the context parameters describing context conditions which are necessary for execution of at least a portion of the rule;

evaluating each of the context parameters associated with the rules with respect to the current code analysis context;

determining which rules and whether the at least a portion of a rule can be executed against the targeted code from the evaluation of the context parameters associated with the rules; and when it has been determined that the at least a portion of the rule can be executed against the targeted code, applying the at least a portion of the rule to the targeted code.

2. The method of claim 1, wherein the targeted code development phase includes one or more stages of design, build, or deployment, and wherein the code type or state includes one or more of a source code, object code, binary code, or an abstraction code state.

3. The method of claim 2, wherein the abstraction state is a design-time analysis of the targeted code that does not provide a complete description thereof.

4. The method of claim 2, wherein the build phase includes a background analysis that occurs against the targeted code that has not yet been compiled to disk and includes one or more of an editing phase, a compilation phase for incremental builds, or before a check-in phase.

5. The method of claim 2, wherein the build phase includes a milestone phase that requires a specific user input to execute the at least a portion of the rule due to expense required for the execution thereof in terms of one or more of analysis duration, required input, required output, high incidence of false positives, scheduling considerations, or because execution is most easily accomplished as part of a batch with other rules.

6. The method of claim 1, wherein the context parameters define the execution conditions of supported code analysis contexts, which are prioritized by one or more of preferred, optional, or required.

7. The method of claim 6, wherein evaluation allows for the overriding of the execution conditions by further evaluating one or more of configuration settings in the one or more development devices, control files associated with the code analysis tool, or allowing for the context parameters to be configurable.

8. The method of claim 1, wherein the rule context parameters are configurable to allow for extending existing context conditions.

9. The method of claim 1, wherein the evaluation of the rule context parameters in view of the current code analysis takes into consideration a hierarchical relationship between the code analysis contexts, the set of rules, or both.

10. In a computing system comprising an analysis tool that checks software using a test case comprising a set of rules, a computer program product for implementing a method of managing execution of the set of rules to apply the rules at an appropriate phase of a code development process by determining a context under which code is developed and applying at least a portion of the rules based on the determined context, the computer program product comprising one or more computer-readable storage media having stored thereon computer-executable instructions that, when executed by one or more processors of the computing system, cause the computing system to perform the method comprising:

receiving targeted code that is to be analyzed for one or more of correctness, completeness, or quality based on a test case comprising a set of rules, each rule in the set of rules having associated context parameters, the context parameters including metadata, the metadata defining each of a run-time duration for completion of analysis, information needed for input, and resulting output;

dynamically performing the steps of:

receiving context information from one or more code developments devices;

determining a current code analysis context from the received context information, the current code analysis context comprising current context conditions, wherein the current code analysis context is defined in terms of two or more of the targeted code development phase, the targeted code type or state, a source manipulating the targeted code, a purpose for the targeted code, or one or more development runtime requirements;

receiving context parameters associated with each rule from the set of rules, the context parameters describing context conditions which are necessary for execution of at least a portion of the rule;

evaluating each of the context parameters associated with the rules with respect to the current code analysis context;

determining which rules and whether the at least a portion of a rule can be executed against the targeted code from the evaluation of the context parameters associated with the rules; and when it has been determined that the at least a portion of the rule can be executed against the targeted code, applying the at least a portion of the rule to the targeted code.

11. The computer program product of claim 10, wherein the targeted code development phase includes one or more stages of design, build, or deployment, and wherein the code type or state includes one or more of a source code, object code, binary code, or an abstraction code state.

12. The computer program product of claim 11, wherein the abstraction state is a design-time analysis of the targeted code that does not provide a complete description thereof.

13. The computer program product of claim 11, wherein the build phase includes a background analysis that occurs against the targeted code that has not yet been compiled to disk and includes one or more of an editing phase, a compilation phase for incremental builds, or before a check-in phase.

14. The computer program product of claim 10, wherein the context parameters are configurable to allow for extending existing context conditions.

15. The computer program product of claim 10, wherein the evaluation of the rule context parameters in view of the current code analysis takes into consideration a hierarchical relationship between the code analysis contexts, the set of rules, or both.

16. In a computing system comprising an analysis tool that checks software using a test case comprising a set of rules, a method of managing execution of the set of rules to apply the rules at an appropriate phase of a code development process by determining a context under which code is developed and applying at least a portion of the rules based on the determined context, the method being performed on one or more computer processors within the computing system, the method comprising:

receiving targeted code that is to be analyzed for one or more of correctness, completeness, or quality based on a test case comprising a set of rules;

dynamically performing the steps of:

receiving context information from one or more code development devices; determining a current code analysis context under which the targeted code is being developed from the received context information;

receiving context parameters associated with rules selected from the set of rules, the context parameters describing context conditions which are necessary for the execution of at least a portion of a rule, the context parameters including metadata, the metadata defining each of a run-time duration for completion of analysis, information needed for input, and resulting output; and evaluating the context parameters in view of the current code analysis context and determining which rules and whether the at least a portion of a rule can be executed against the targeted code;

when it has been determined that the at least a portion of the rule can be executed against the targeted code, applying the at least a portion of the rule to the targeted code; and wherein the current code analysis context is defined in terms two or more of the targeted code development phase, the targeted code type or state, a source manipulating the targeted code, a purpose for the targeted code, or one or more development or runtime requirements, wherein the targeted code development phase includes one or more stages of design, build, or deployment, and wherein the code type or state includes one or more of a source code, object code, binary code, or an abstraction code state, and wherein the build phase includes a background analysis that occurs against the targeted code that has not yet been compiled to disk and includes one or more of an editing phase, a compilation phase for incremental builds, or before a check-in phase.

* * * * *